(12) United States Patent
Wenstrup

(10) Patent No.: US 11,987,985 B2
(45) Date of Patent: May 21, 2024

(54) METAL ROOFING SYSTEM

(71) Applicant: Milliken & Company, Spartanburg, SC (US)

(72) Inventor: David E. Wenstrup, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 301 days.

(21) Appl. No.: 17/709,595

(22) Filed: Mar. 31, 2022

(65) Prior Publication Data

US 2022/0333383 A1 Oct. 20, 2022

Related U.S. Application Data

(60) Provisional application No. 63/177,021, filed on Apr. 20, 2021.

(51) Int. Cl.
*E04D 3/35* (2006.01)
*B32B 5/02* (2006.01)
(Continued)

(52) U.S. Cl.
CPC .............. *E04D 3/351* (2013.01); *B32B 5/022* (2013.01); *B32B 5/10* (2013.01); *B32B 15/14* (2013.01);
(Continued)

(58) Field of Classification Search
CPC .. E04D 3/351; E04D 3/18; E04D 1/22; E04D 3/30; E04D 3/35; E04D 12/002;
(Continued)

(56) References Cited

U.S. PATENT DOCUMENTS 4,230,753 A 10/1980 Sheyon
4,244,817 A 1/1981 Yaginuma
(Continued)

FOREIGN PATENT DOCUMENTS

EP 1710337 10/2006
EP 3483353 A1 5/2019
(Continued)

OTHER PUBLICATIONS

Search Report and Written Opinion for PCT/US2022/023626 (9 pages). (Year: 2022).*
(Continued)

*Primary Examiner* — Rodney Mintz
(74) *Attorney, Agent, or Firm* — Cheryl J. Brickey

(57) ABSTRACT

A metal roofing system contains, in order a roof deck, a fire resistant (FR) fleece, and a metal sheeting system. The second side of the FR fleece faces the roof deck. The FR fleece contains a plurality of FR staple fibers and a plurality of first char scaffold fibers. The FR fleece has a fleece thickness defined as the distance between the first side and the second side. The metal sheeting system contains a plurality of metal sheets having an upper and lower side, where the lower side of the metal sheeting system faces the first side of the FR fleece. The metal sheets have an average metal sheet thickness defined as the distance between the upper and lower sides, where the thickness of the FR fleece is at least about 3 times the average metal sheet thickness. The FR fleece has a density of less 0.5 g/cm³.

19 Claims, 1 Drawing Sheet

(51) Int. Cl.
*B32B 5/10* (2006.01)
*B32B 15/14* (2006.01)
*E04D 1/22* (2006.01)
*E04D 3/18* (2006.01)

(52) U.S. Cl.
CPC ............ *E04D 3/18* (2013.01); *B32B 2250/02* (2013.01); *B32B 2250/03* (2013.01); *B32B 2262/10* (2013.01); *B32B 2262/144* (2021.05); *B32B 2307/3065* (2013.01); *B32B 2419/06* (2013.01); *E04D 1/22* (2013.01)

(58) Field of Classification Search
CPC ........... B32B 5/022; B32B 5/10; B32B 15/14; B32B 2250/02; B32B 2250/03; B32B 2262/10; B32B 2262/144; B32B 2307/3065; B32B 2419/06
See application file for complete search history.

(56) References Cited

U.S. PATENT DOCUMENTS

| | | |
|---|---|---|
| 4,543,158 A | 9/1985 | Bondoc |
| 4,595,636 A | 6/1986 | Wiercinski |
| 4,600,635 A | 7/1986 | Wiercinski |
| 4,666,761 A | 5/1987 | Stamper |
| 4,944,818 A | 7/1990 | Dybsky |
| 5,169,690 A | 12/1992 | Zimmerman |
| 5,525,413 A | 6/1996 | Daurer |
| 5,540,022 A | 7/1996 | Morris |
| 5,658,972 A | 8/1997 | Grzybowski |
| 6,110,846 A | 8/2000 | Brzozowski |
| 6,360,511 B1 | 3/2002 | Brzozowski |
| 6,586,353 B1 | 7/2003 | Kiik |
| 6,696,125 B2 | 2/2004 | Zanchetta |
| 6,764,733 B1 | 7/2004 | Clarke |
| 6,864,195 B2 | 3/2005 | Peng |
| 6,869,661 B1 | 3/2005 | Ahr |
| 7,115,313 B2 | 10/2006 | Zanchetta |
| 7,132,143 B2 | 11/2006 | Zanchetta |
| 7,153,794 B2 | 12/2006 | Wenstrup |
| 7,157,137 B2 | 1/2007 | Wenstrup |
| 7,169,719 B2 | 1/2007 | Mehta |
| 7,229,938 B2 | 6/2007 | Wenstrup |
| 7,341,963 B2 | 3/2008 | Wenstrup |
| 7,446,065 B2 | 11/2008 | Wenstrup |
| 7,454,817 B2 | 11/2008 | Wenstrup |
| 7,491,438 B2 | 2/2009 | Demott |
| 7,521,386 B2 | 4/2009 | Wenstrup |
| 7,651,964 B2 | 1/2010 | Thompson |
| 7,709,405 B2 | 5/2010 | Wenstrup |
| 7,914,635 B2 | 3/2011 | Thompson |
| 7,977,259 B2 * | 7/2011 | Ratcliff ................... D06N 5/00 442/67 |
| 8,206,817 B2 | 6/2012 | Donovan |
| 9,523,203 B2 | 12/2016 | Zhou |
| 9,580,902 B2 | 2/2017 | Kalkanoglu |
| 9,605,433 B2 | 3/2017 | Paradis |
| 9,963,880 B2 | 5/2018 | Kraus |
| 10,017,943 B1 | 7/2018 | Zhou |
| 10,155,693 B1 | 12/2018 | Spreen |
| 10,246,802 B2 | 4/2019 | Jeong |
| 10,443,190 B2 | 10/2019 | Wenstrup |
| 10,655,329 B1 | 5/2020 | Redford |
| 11,192,328 B2 * | 12/2021 | Zhou ................... B32B 27/304 |
| 2003/0073368 A1 | 4/2003 | Berkhoff |
| 2003/0100233 A1 | 5/2003 | Fynan |
| 2004/0033741 A1 | 2/2004 | Peng |
| 2004/0127120 A1 | 7/2004 | Zanchetta |
| 2004/0171318 A1 | 9/2004 | Rashed |
| 2005/0250399 A1 | 11/2005 | Kuhn |
| 2005/0282449 A1 | 12/2005 | Mehta |
| 2006/0116043 A1 | 6/2006 | Hope |
| 2006/0199453 A1 | 9/2006 | Kuhn |
| 2006/0228963 A1 | 10/2006 | Souther |
| 2006/0292945 A1 | 12/2006 | Kuhn |
| 2007/0066176 A1 | 3/2007 | Wenstrup |
| 2008/0102243 A1 | 5/2008 | Gupta |
| 2008/0289289 A1 | 11/2008 | Wiercinski |
| 2009/0011675 A1 | 1/2009 | Ratcliff |
| 2010/0087113 A1 | 4/2010 | Bindschedler |
| 2010/0285101 A1 | 11/2010 | Moore |
| 2012/0237743 A1 | 9/2012 | O'Donnell |
| 2012/0244340 A1 | 9/2012 | Peng |
| 2013/0065470 A1 | 3/2013 | Rock |
| 2013/0177754 A1 | 7/2013 | Migliavacca |
| 2014/0013693 A1 | 1/2014 | Zhou |
| 2014/0062126 A1 | 3/2014 | Weinberg |
| 2014/0147642 A1 | 5/2014 | Weinberg |
| 2014/0230999 A1 | 8/2014 | Weinberg |
| 2014/0335750 A1 | 11/2014 | Adams |
| 2015/0224751 A1 | 8/2015 | Oh |
| 2016/0023428 A1 | 1/2016 | Adams |
| 2016/0039176 A1 | 2/2016 | Weinberg |
| 2016/0069067 A1 | 3/2016 | Ciuperca |
| 2016/0237594 A1 | 8/2016 | Rock |
| 2016/0312471 A1 | 10/2016 | Hubbard |
| 2017/0044770 A1 | 2/2017 | Hubbard |
| 2017/0210100 A1 | 7/2017 | Leatherman |
| 2018/0023301 A1 | 1/2018 | Wang |
| 2018/0094439 A1 | 4/2018 | Wang |
| 2018/0100256 A1 | 4/2018 | Handermann |
| 2018/0257984 A1 | 9/2018 | Spreen |
| 2018/0305931 A1 | 10/2018 | Zhou |
| 2018/0362402 A1 | 12/2018 | Spreen |
| 2018/0370063 A1 | 12/2018 | Lehmann |
| 2019/0003184 A1 | 1/2019 | Wang |
| 2019/0003185 A1 | 1/2019 | Wang |
| 2019/0105868 A1 * | 4/2019 | Zhou ................... B32B 5/022 |
| 2019/0127975 A1 | 5/2019 | Spreen |
| 2019/0136447 A1 * | 5/2019 | Wenstrup ............... B32B 27/12 |
| 2020/0070475 A1 | 3/2020 | Hermans |
| 2020/0173165 A1 | 6/2020 | Nandi |
| 2020/0277790 A1 | 9/2020 | Wenstrup |
| 2021/0285219 A1 | 9/2021 | Wenstrup |
| 2021/0332591 A1 | 10/2021 | Wenstrup |

FOREIGN PATENT DOCUMENTS

| | | | |
|---|---|---|---|
| WO | 2001009420 | 2/2001 | |
| WO | 2005003447 | 1/2005 | |
| WO | WO-2011003052 A1 * | 1/2011 | ............ B32B 27/12 |
| WO | 2013028250 | 2/2013 | |
| WO | WO-2017197136 A1 * | 11/2017 | ............ B32B 27/12 |
| WO | 2020225200 | 11/2020 | |

OTHER PUBLICATIONS

Bull. Mater. Sci., vol. 15, No. 1, Feb. 1992, pp. 67-76.
International Preliminary Report on Patentability issued in App. PCT/US2021/01762, mailing date Sep. 22, 2022, 8 pages.
Complete Textile Glossary, Celanese Acetate LLC, 2001. 5 pages.

* cited by examiner

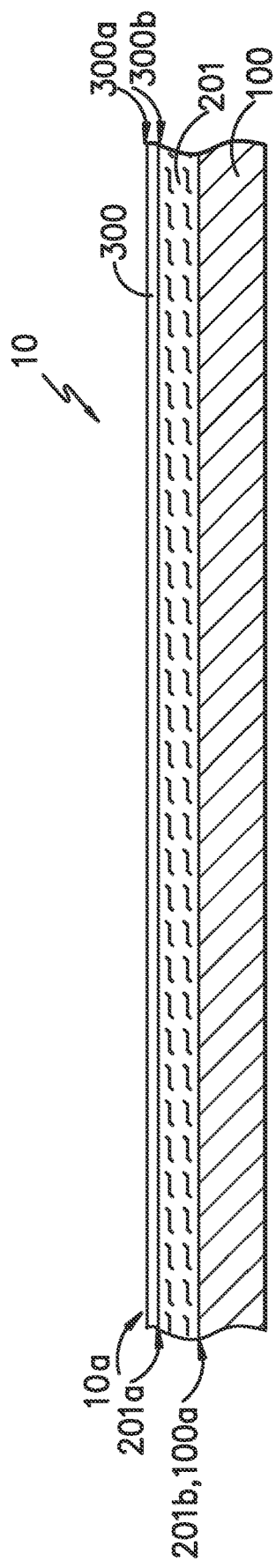
FIG. -1-
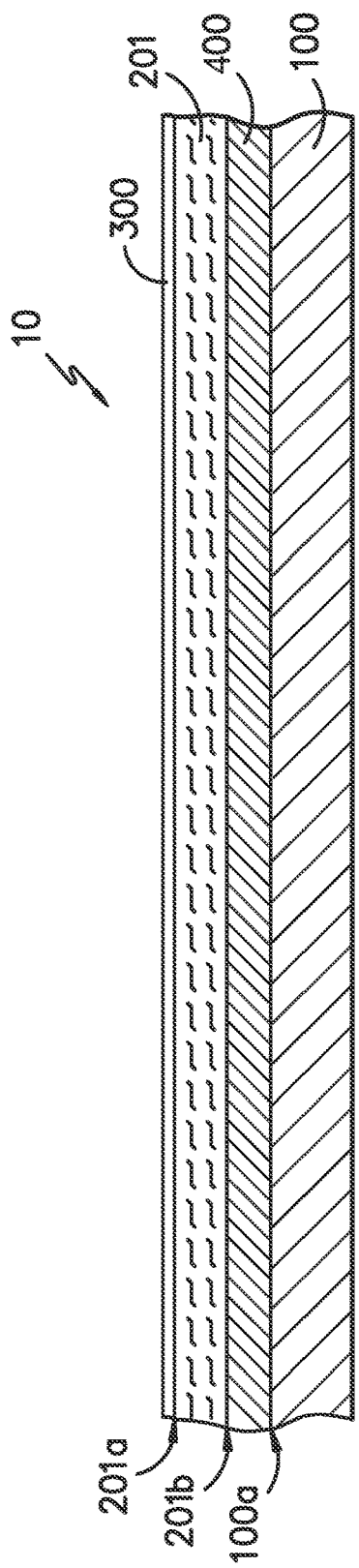
FIG. -2-

METAL ROOFING SYSTEM

RELATED APPLICATIONS

This application claims priority to U.S. Provisional Patent Application 63/177,021, filed on Apr. 20, 2021, which is herein incorporated by reference in its entirety.

TECHNICAL FIELD

The present invention relates generally to metal roofing systems, more particularly to metal roofing systems with a fire resistant fleece.

BACKGROUND

Metal roofing systems are popular in both commercial and residential applications. Metal roofing systems are sometimes preferred because of their longevity, environmental friendliness, and energy efficiency. There are still improvements to be made to help with some disadvantages of metal roofing compared to the traditional bitumen shingle roofing systems or to other systems including ceramic tile or various membrane systems. It would be beneficial to have an improved metal roofing system incorporating a fire resistant (FR) fleece into the system.

BRIEF SUMMARY OF THE INVENTION

A metal roofing system containing in order a roof deck, a fire resistant fleece, and a metal sheeting system. The roof deck has an upper side. The fire resistant (FR) fleece has a first side and a second side, where the second side of the FR fleece faces the roof deck. The FR fleece contains a plurality of FR staple fibers and a plurality of first char scaffold fibers. The FR fleece has a fleece thickness defined as the distance between the first side and the second side. The metal sheeting system contains a plurality of metal sheets having an upper and lower side, where the lower side of the metal sheeting system faces the first side of the FR fleece. The metal sheets have an average metal sheet thickness defined as the distance between the upper and lower sides, where the thickness of the FR fleece is at least about 3 times the average metal sheet thickness. The FR fleece has a density of less 0.5 g/cm³.

BRIEF DESCRIPTION OF THE DRAWINGS

The present invention is best understood with reference to the following detailed description of embodiments of the invention when read in conjunction with the attached drawings, in which like numerals refer to like elements, and in which:

FIGS. 1-2 show cross-sectional illustrations showing different embodiments of the metal roofing system.

DETAILED DESCRIPTION

Referring now to FIG. 1, there is shown a cross-sectional illustration of one embodiment of the metal roofing system 10. The metal roofing system 10 has an upper side 10a which normally forms the outer surface of the metal roofing system and contains a roof deck 100 having an upper side 100a. The roof deck is generally described as a construction member or system comprising one or more essentially planar elements of, but not limited to, steel, aluminum, concrete, wood, oriented strand board, plywood, gypsum, composites, or other rigid or semi-rigid materials and which may form or rest upon one or more structural construction members, and which serves typically as a base onto which additional roofing elements are added or built up. In one preferred embodiment, the roofing deck comprises wood, preferably in the form of wood boards or wood sheets.

The metal roofing system 10 also contains a FR fleece 201 which contains a plurality of FR staple fibers and a plurality of first char scaffold fibers and has a first side 201a and a second side 201b. The second side 201b400 of the FR fleece faces the roof deck 100. The FR fleece has a fleece thickness defined as the distance between the first side and the second side.

The metal roofing system 10 also contains a metal sheeting system 300 having an upper side 300a and lower side 300b and contains a plurality of metal sheets. The lower side 300b of the metal sheeting system 300 faces the first side 201a of the FR fleece 201. The metal sheets have an average metal sheet thickness defined as the distance between the upper and lower sides.

Preferably, the fleece 201 is constructed as a fire resistant (FR) fleece to give the protections to impart some FR characteristics to the metal roofing system 10. Specifically, the FR fleece is designed to create a structurally stable char barrier which once formed will protect the built up roofing system and/or roof deck from a fire event. In one embodiment, the FR fleece has a thickness of greater than about 0.5 mm, more preferably greater than about 1 mm. In another embodiment, the FR fleece has a thickness of less than about 10 mm, more preferably less than about 8 mm, more preferably less than about 5 mm. In one preferred embodiment, the FR fleece has a thickness of between about 1 and 5 mm.

The FR fleece contributes to many important and valued characteristics of the overall metal roofing system. Due to the fleece's thickness and compression ability, the FR fleece may increase the engineering tolerance for metal roof joint connections. The metal roof connections still fit well when the preexisting roof deck deviates to a greater tolerance from a flat plain. Additionally, the increased thickness leads to more and larger interstitial void spaces for increased sound dampening, and greater R-value. The compression ability allowing for reduction of material shock on structural elements from temperature fluctuations and provides an expansion buffer for material movement throughout the entirety of the roofing system.

Preferably, the FR fleece 201 thickness is at least about 3 times the average metal sheet thickness and the FR fleece has a density of less 0.5 g/cm³. Preferably, the FR fleece 201 thickness is at least about 5 times the average metal sheet thickness and the FR fleece has a density of less 0.25 g/cm³.

The FR fleece preferably contains a plurality of a plurality of FR fibers and a plurality of first char scaffold fibers. In one embodiment, the FR fleece 201 comprises between about 30 and 70% by weight FR staple fibers, between about 20 and 50% by weight FR first char scaffold fibers. Preferably, the FR staple fibers are FR rayon staple fibers. In another preferred embodiment, the FR fleece 201 also contains non-FR fibers. In one embodiment, the FR fleece 201 contains between about 0 and 30% by weight non-FR (typically polyester with no FR additives) fibers. In another embodiment, the FR fleece 201 contains less than about 25% weight (wt) non-FR fibers, preferably less than about 15% wt. In another embodiment, the FR fleece 201 contains at least 1% wt non-FR fibers, preferably greater than about 5% wt.

The non-FR fibers may be any suitable fiber and are included for loft and bulking of the fleece. Non-FR fibers tend to be less expensive than FR fibers so it is advantageous from a cost standpoint to be able to include a percentage of non-FR fibers in the FR fleece 201. These non-FR fibers provide volume in the z direction (perpendicular to the plane of the metal roofing system) of the nonwoven material. Types of bulking fibers would include fibers with high denier per filament (5 denier per filament or larger), high crimp fibers, hollow-fill fibers, and the like. These fibers provide mass and volume to the material. Examples of fibers used as bulking fibers include polyester, and polypropylene, as well as other low cost fibers. In one embodiment, the non-FR fibers are thermoplastic fibers, preferably polyester fibers. Preferably, the polyester fibers are crimped to maximize the amount of loft from the fibers. Additionally, these non-FR fibers help to carry the FR fibers which typically have little to no crimp and can be quite brittle. In one embodiment, the percentage by weight of non-FR fibers in the FR fleece is between about 0 and 80% wt, more preferably between about 0 and 35% wt, more preferably between about 0 and 20% wt.

The FR fleece also contains an FR fiber, which is defined to be fibers having a Limiting Oxygen Index (LOI) value of 20.95 or greater, as determined by ISO 4589-1. The FR fiber may be, for example, FR chemically treated fibers and/or inherently FR fibers. Preferably, the FR fibers are FR rayon staple fibers. In one embodiment, the percentage by weight of FR fibers in the FR fleece is between about 20 and 80%, more preferably between about 25 and 65, more preferably between about 25 and 45%.

The FR fleece also preferably includes a plurality of first char scaffold fibers. Char scaffold fibers are defined to be fibers that once burned, retain a portion (at least about 80%) of their original strength. These fibers give strength to the fleece after other FR fibers such as the FR rayon fibers are oxidized into a char barrier. The char scaffold fibers may be mineral fibers such as silica and basalt, aramids, carbon fibers including partially oxidized polyacrylonitrile (PAN) and fully carbonized carbon, and/or ceramic fibers. Preferably, the char scaffold fibers are partially oxidized acrylonitrile (also sometimes referred to as PANOX) staple fibers or silica staple fibers. In one embodiment, the char scaffold fibers are partially oxidized acrylonitrile staple fibers. In another embodiment, the char scaffold fibers are silica staple fibers. Preferably, the FR fibers and char scaffold fibers are different fibers (made from different materials). In one embodiment, the percentage by weight of first char scaffold fibers in the FR fleece is between about 20 and 80%, more preferably between about 25 and 65, more preferably between about 25 and 45%.

In a further preferred embodiment, a 50/50 mixture by weight of partially oxidized acrylonitrile fabrics and mineral fibers provided a surprising FR improvement in performance due to increased char strength.

Often the char scaffold fibers employed are more brittle and contain significantly less crimp than more traditional fibers used in these applications. For these reasons, numerous enhancements are encouraged including elliptical needling, and proper blending of the fibers in terms of both type and denier to allow proper web formation and carriage through the carding process. Additionally, appropriate web weight and number of crosslaps becomes extremely important when dispersing fibers such as silica and basalt to impart a scaffolding to the char barrier formation.

The fibers in the FR fleece are typically blended to create a uniform fiber blend but when certain performance characteristics are desired can be stratified and or layered. Additionally, the FR fleece may have additional treatments added to it after batt formation including intumescent chemistries, elliptical needle entanglement, calendering, and the like.

In one embodiment, the nonwoven fleece has a tensile strength of between 100 and 1000 lb/f and a tear strength of between 50 and 500 lb/f. This strong fleece may be regular or FR. Tensile strength is measured according to ASTM D4632 and tear strength is measured according to ASTM D4533.

In one embodiment, the FR fleece 201 contains a reinforcing scrim located within the fleece. The reinforcing scrim embedded into the fleece and the nonwoven fleece (including the scrim) preferably has a tensile strength of between 100 and 1000 $lb_f$ and a tear strength of between 50 and 500 $lb_f$. Tensile strength is measured according to ASTM D4632 and tear strength is measured according to ASTM D4533. This reinforcing scrim may contain the first char scaffold fibers (therefore contributing the first scaffold fibers to the FR fleece 201 when the scrim is located in the fleece) or alternatively, may contain second char scaffold fibers. In this embodiment, the FR fleece would contain first char scaffold fibers (preferably as loose fibers) and second char scaffold fibers in the form of a reinforcing scrim. The second char scaffold fibers may be selected from the same group of materials as the first char scaffold fibers. In one embodiment, the second char scaffold fibers are a different fiber than the first char scaffold fibers. In one embodiment, the reinforcing scrim can be made from the same materials (preferably glass fibers) as the first carrier.

This optional reinforcing scrim in the FR fleece 201 provides additional integrity to the fleece both before and after a fire event. The reinforcing scrim is preferably incorporated into the fleece, preferably needle-punched with the nonwoven fibers to create the nonwoven fleece. It has been found that needling the fleece into the scrim the addition of the scrim within the fleece increased the strength of the fleece as compared to having the scrim on one side of adhered to the fleece. Preferably, the scrim within the FR fleece 201 comprises a plurality of yarns. These yarns are preferably formed from a plurality of fibers which have an average staple length of at least about 12 inches. More preferably, the fibers have an average staple length of at least about 20 inches, more preferably at least about 10 feet, more preferably at least about 100 feet, more preferably considered continuous yarns. In another embodiment, the fleece may contain a plurality of yarns as described above not in a scrim structure. The reinforcing scrim can be any suitable fabric including knit, woven, or non-woven and has a machine and cross-machine direction. The reinforcing scrim preferably has a thickness of between about 5 and 15 mils. In one embodiment, the FR fleece contains a plurality of yarns that are not in the form of a scrim, these may be unidirectional or randomly placed yarns within the fleece.

In one embodiment, the reinforcing scrim is a laid scrim where yarns (or fibers) are laid in the machine and cross machine direction or multi-axially and are attached together at their cross-over points. Typically, the scrim is designed in an open construction such that fibers from the nonwoven pass around and through the scrim. Preferably, tensile strength of the reinforcing scrim in the machine direction is at least about 100 lb/f. This allows installation of the roofing membrane from large rolls without significant distortion. Additionally, it improves the wind uplift performance of the roofing system.

The yarns/fibers making up the reinforcing scrim within the FR fleece 201 may be any suitable yarn or fiber. "Yarn", in this application, as used herein includes a monofilament elongated body, a multifilament elongated body, ribbon, strip, fiber, tape, and the like. The term yarn includes a plurality of any one or combination of the above. The yarns may be of any suitable form such as spun staple yarn, monofilament, or multifilament, single component, bi-component, or multi-component, continuous filament and have any suitable cross-section shape such as circular, multi-lobal, square or rectangular (tape), and oval. Some suitable materials for the yarns include aramid (including meta and para forms), polyester, polyolefin, nylon (including nylon 6, nylon 6,6, and nylon 4,6), steel, carbon, fiberglass, and polyethylene terephthalate (polyester or PET). In one preferred embodiment, the scrim contains polyester yarns. In another preferred embodiment, the scrim contains glass fibers.

In one embodiment, the FR fleece is attached to the roofing deck. In one preferred embodiment, the FR fleece is laid out and attached to the roof deck before the metal sheeting is laid on. In another embodiment, the FR fleece is attached to the metal sheeting. In one preferred embodiment, the FR fleece attached to the metal sheeting and is installed onto the roof deck as the metal sheeting is applied to the roof deck. In another embodiment, the FR fleece is attached to both the roof deck and the metal sheeting, this may be done at the same time or to each layer (deck, sheeting) separately. In one embodiment, the FR fleece is attached to the metal sheeting and/or roof decking by any suitable attachment means. These attachment means may be nails, screws, adhesive, staples, brads, bolts, and mixtures thereof, for example. The adhesive may be any suitable type of adhesive such as pressure sensitive, hot melt adhesive (mopped, sprayed), or curing type adhesives. The adhesive may be any suitable type of adhesive such as, but not limited to, pressure-sensitive adhesives; molten or heat-activated materials; mopped-on, roller-applied, squeegee-applied, and/or spray-applied adhesives of various types and curing modalities; many of which are commonly utilized in roofing applications today, such as, by way of example, Flexible FAST™ two-part polyurethane adhesive or CAV-GRIP® III adhesive/primer, both manufactured by and commercially available from Carlisle Syntec Systems."

In one embodiment, the FR fleece further contains a water barrier layer on at least one side of the FR fleece. The water barrier layer may be on the first side, the second side, or both sides of the FR fleece. The water barrier may be any suitable water barrier such as a polymer coating or film. The water barrier layer may be coated onto the FR fleece (and therefore at least partially impregnating into the FR fleece) or may be attached only to the surface of the side. It may be attached to the FR fleece by any suitable means. In one embodiment, the water barrier or the FR fleece becomes the adhesive for example by melt coating or solvent/water coating chemistry onto the FR fleece or by the FR fleece containing some low melt polymer fibers that can bond to the water barrier layer. In one embodiment, the water barrier layer contains a material selected from the group consisting of polyethylene, polypropylene, bitumen, silicone, polyvinyl butyral. In one preferred embodiment, the water barrier layer contains bitumen.

In one embodiment, the FR fleece comprises a coating or additional layer on at least one surface of the fleece. This coating or additional layer may provide adhesion to other elements within the system, provide a water barrier, provide an anti-slip property, or provide an anti-soiling property. While anti-slip characteristics are desirable for safety reasons during installation, one or more of these properties may be especially desirable in situations where a delay occurs between installation of the FR fleece and installation of the metal sheeting, during which time the FR fleece may be subject to construction foot traffic, weathering, and/or construction or environmental soiling. These properties may be imparted through surface modifications of the coating, solar-catalytic additives or layers, or other means. In one embodiment, the metal roofing system contains an additional layer 400 such as shown in FIG. 2. The is additional layer is shown as being located between the FR fleece 201 and the roofing deck 100, but it may also be located between the FR fleece 201 and the metal sheeting system 300. In another embodiment, more than one additional layer may be used in the metal roofing system.

In one embodiment, the additional layer is a first carrier layer in the form of a knit, woven, or nonwoven scrim or nonwoven mat. In one embodiment, the first carrier can be a combination of a scrim and a mat, preferably where the scrim is attached to or embedded into the mat. In one preferred embodiment, the first carrier is a laid scrim with continuous fibers/yarns. In another preferred embodiment, the first carrier is a nonwoven mat containing staple fibers. In another preferred embodiment, the first carrier is a nonwoven mat containing chopped glass strand. Preferably, in one embodiment, the fibers (either staple or continuous) are preferably glass.

In another embodiment, the additional layer 400 is additional wooden decking or an insulation layer. In the embodiment where the additional layer is an insulation layer, the FR fleece may be attached (and installed with) the insulation layer.

In another embodiment, the additional layer may be an adhesive layer to better help the elements adhere together (this may be in the form of a stand alone layer or may be attached or coated onto one of the existing elements within the system). The adhesive may be a pressure sensitive adhesive or may be melt coated or solvent coated or otherwise as described above.

In another embodiment, the additional layer may be a UV barrier or the layer may contain UV reflecting or absorbing material. In another embodiment, the additional layer may be a water barrier layer. This water barrier layer may be any suitable layer that does not allow water to penetrate, i.e. non-porous to water. This may, for example, be a thermoplastic or thermoset film.

The metal roofing system 10 is preferably attached to a roof deck or built-up roof deck 100. The metal roofing system 10 is preferably oriented such that the FR fleece 201 is adjacent the roof deck or to the roof deck. A roof deck is generally described as a construction member or system comprising one or more essentially planar elements of, but not limited to, steel, aluminum, concrete, wood, oriented strand board, plywood, gypsum, composites, or other rigid or semi-rigid materials and which may form or rest upon one or more structural construction members, and which serves either as a complete roofing system or, more typically, as a base onto which additional roofing elements are added or built up.

A built-up roof deck is generally described as a roofing system comprising one or more essentially planar, parallel, and/or co-planar elements built up from among a roof deck; asphalt or bituminous layer(s); adhesive layer(s); textile layers; insulating layer(s) of foam or other materials; textile reinforcement layer(s); paper, film and/or membrane layers; board or composite layer(s) of wood, oriented strand board, plywood, gypsum, gypsum plus fiber, foam, cement, concrete, or other rigid or semi-rigid materials, with or without paper and/or textile facer(s) and/or reinforcement layer(s); waterproofing material layer(s) comprising one or more polymers, elastomers, asphalts, or bitumens, with or without plasticizers, other additives or modifiers, and/or textile reinforcement; sheet metal layer(s); functional coating layer(s); granule or granules layer(s); and other layer(s); and which may or may not further comprise attachment fasteners disposed more or less perpendicularly to one or more of the planar, parallel, and/or co-planar elements. The built-up roof deck may refer to either 1) a complete roofing system comprising a roof deck plus one or more essentially planar, parallel, and/or co-planar elements as described above, with or without fasteners; or, 2) an incomplete or partial roofing system comprising a roof deck plus one or more essentially planar, parallel and/or co-planar elements as described above, with or without fasteners, but also omitting certain essentially planar, parallel and/or co-planar elements as described above.

Another way of describing a built-up roof deck is a roofing system comprising one or more essentially planar, parallel and/or co-planar elements added or built up for purposes including, but not limited to waterproofing, insulation, wind uplift resistance, fire resistance and/or retardance, forming a moisture and/or vapor barrier, adhesion, hail resistance, resistance to damage from foot or machine traffic, ultraviolet radiation protection, resistance to chemical or biological degradation, and the like, and which may or may not further comprise attachment fasteners disposed more or less perpendicularly to one or more of the planar, parallel, and/or co-planar elements. The built-up roof deck may refer to either 1) a complete roofing system comprising a roof deck plus one or more essentially planar, parallel and/or co-planar elements as described above, with or without fasteners; or, 2) an incomplete or partial roofing system comprising a roof deck plus one or more essentially planar, parallel and/or co-planar elements as described above, with or without fasteners, but also omitting certain essentially planar, parallel and/or co-planar elements as described above.

The metal sheet system preferably comprises a plurality of overlapping metal sheets. These metal sheets may also be referred to as panels or tiles. The sheets preferably interlock similar to a hardwood floor such that the screws or brackets and clips (or other attachment means) used to attach that metal sheet to the roof deck and other elements are covered up by the adjacent metal sheet. In one preferred embodiment, the screws (or nails) extend all of the way from the metal sheet into the roof deck to hold the whole system in place.

Traditional application of the system and its components to a roof deck is done with decking screws and washers, followed by overlapping of the next membrane layer to cover the screw and washer hardware from the weather. Recent advances in adhering roofing membranes to roof decks or to built-up roof decks have focused on using adhesives to fully adhere the entire membrane to the roof deck or to the built-up roof deck. In one embodiment, composites are fully 'glued' down to the built-up roof deck. This can often display significantly improved wind uplift results by eliminating pockets of non-adhered membrane from uplifting and causing stress on the mechanically adhered sections. There may be additional adhesives between the layers within the metal roofing system 10, or in some embodiments, the bitumen serves as the adhesive between adjacent elements within the composite 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A metal roofing system comprising, in order:
 a roof deck having an upper side;
 a fire resistant (FR) fleece having a first side and a second side, wherein the second side of the FR fleece faces the roof deck, wherein the FR fleece comprises a reinforcing scrim embedded therein, a plurality of FR staple fibers and a plurality of first char scaffold fibers selected from the group consisting of partially oxidized acrylonitrile fibers, silica fibers, and ceramic fibers, wherein the FR fleece has a fleece thickness defined as a distance between the first side and the second side; and,
 a metal sheeting system comprising a plurality of metal sheets having an upper and lower side, wherein the lower side of the metal sheeting system faces the first side of the FR fleece, wherein the metal sheets have an average metal sheet thickness defined as a distance between the upper and lower sides,
 wherein the fleece thickness is about 3 times to about 5 times the average metal sheet thickness, and wherein the FR fleece has a density of less than 0.5 g/cm$^3$.

2. The metal roofing system of claim 1, wherein the roof deck comprises wood.

3. The metal roofing system of claim 1, wherein the fleece thickness is between about 1 and 5 mm.

4. The metal roofing system of claim 1, wherein each of the metal sheets have a first edge and a second edge, wherein the metal sheets overlap such that the first edge of a respective metal sheet overlaps the second edge of an adjacent said metal sheet.

5. The metal roofing system of claim 1, wherein the fleece thickness is about 5 times the average metal sheet thickness.

6. The metal roofing system of claim 1, wherein the density of the FR fleece is less than 0.25 g/cm$^3$.

7. The metal roofing system of claim 1, wherein the FR fleece comprises between about between about 30 and 70% by weight FR staple fibers, between about 20 and 50% by weight char scaffold fibers, and between about 0 and 30% by weight polyester fibers.

8. The metal roofing system of claim 1, wherein at least a portion of the first char scaffold fibers is located in the reinforcing scrim embedded into the FR fleece.

9. The metal roofing system of claim 1, wherein the FR fleece further comprises a plurality of second char scaffold fibers located in the reinforcing scrim embedded into the fleece selected from the group consisting of glass fibers, carbon fibers, partially oxidized acrylonitrile fibers, polyphenylene sulfide fibers, and aramid fibers.

10. The metal roofing system of claim 1, wherein the system further comprises an additional layer located between the FR fleece and the roof deck.

11. The metal roofing system of claim 10, wherein the additional layer comprises an insulation layer.

12. The metal roofing system of claim 10, wherein the additional layer comprises an adhesive layer.

13. The metal roofing system of claim 10, wherein the additional layer comprises a water barrier layer.

14. The metal roofing system of claim 10, wherein the additional layer comprises a UV barrier, printability layer, soil release layer, or anti-slip layer.

15. The metal roofing system of claim 1, wherein the system further comprises an additional layer located between the FR fleece and the metal sheeting system.

16. The metal roofing system of claim 15, wherein the additional layer comprises an insulation layer.

17. The metal roofing system of claim 15, wherein the additional layer comprises an adhesive layer.

18. The metal roofing system of claim 15, wherein the additional layer comprises a water barrier layer.

19. The metal roofing system of claim 15, wherein the additional layer comprises a UV barrier, printability layer, soil release layer, or anti-slip layer.

\* \* \* \* \*